(12) United States Patent
Magruder

(10) Patent No.: US 6,441,730 B1
(45) Date of Patent: Aug. 27, 2002

(54) ELECTRONICS MODULE FOR BRAKE LAMP DIAGNOSTICS

(75) Inventor: Angela Dawn Magruder, Merritt Island, FL (US)

(73) Assignee: Lear Automotive Dearborn, Inc., Dearborn, MI (US)

(*) Notice: Subject to any disclaimer, the term of this patent is extended or adjusted under 35 U.S.C. 154(b) by 0 days.

(21) Appl. No.: 09/096,099

(22) Filed: Jun. 11, 1998

(51) Int. Cl.[7] ............................................. B60Q 11/00
(52) U.S. Cl. ...................... 340/458; 340/438; 340/453
(58) Field of Search ................................. 340/458, 438, 340/453, 641, 642

(56) References Cited

U.S. PATENT DOCUMENTS 5,057,814 A * 10/1991 Onan et al. .................. 340/458
5,075,669 A * 12/1991 Nakadozono et al. ....... 340/458
5,801,623 A * 9/1998 Chen et al. .................. 340/548

FOREIGN PATENT DOCUMENTS

| DE | 22 35 642 A | 1/1974 |
| DE | 196 10 871 C | 6/1997 |
| EP | 0 105 676 A | 4/1984 |
| EP | 0 365 697 A | 5/1990 |

* cited by examiner

Primary Examiner—Daryl Pope
(74) Attorney, Agent, or Firm—MacMillan, Sobanski & Todd, LLC

(57) ABSTRACT

A microprocessor based control detects actuation of the vehicle's braking system and compares the actual magnitude of the lamp current drawn by the system's brake lamps during illumination with reference signals indicative of the nominal value of brake lamp excitation current required for illumination of a full complement of brake lamps and that associated with successively lesser numbers of operating lamps, to determine the presence and number of inoperative lamps and to record the existence of failed lamps in memory which may be accessed by external diagnostic equipment.

16 Claims, 3 Drawing Sheets

ELECTRONICS MODULE FOR BRAKE LAMP DIAGNOSTICS

CROSS REFERENCE TO RELATED APPLICATIONS

Some of the information disclosed and claimed in this application is also disclosed in a commonly owned, co-pending application entitled: Electronics Module for the Control and Diagnostics of Automobile Signal Lamps, U.S. Ser. No. 09/096,018 filed on even date herewith by Angela D. Magruder.

TECHNICAL FIELD

This invention relates to automobile lamp systems, and more particularly to the performance monitoring of automobile brake signal lamps.

BACKGROUND ART

With the significant advances in automobile performance, there have been corresponding improvements to occupant safety as well as to vehicle service and repair. This includes improved occupant safety devices, improved vehicle crash worthiness, and improved engine reliability. One element of these improvements has been the added electronic content of the automobile operating systems; both control and fault diagnosis. The leading application for developing electronic content has been in connection with control of engine performance; primarily directed toward reduced emissions, but increasingly used to provide improved engine diagnostics. This allow for more accurate repairs and also provides forewarning to the operator of potential engine failure. All of this results in greater security to the automobile occupants as well as better repair programs.

One aspect, however, of the automobile's operating systems that has not received as many advances in technology is the vehicle brake lamp subsystem. The proper functioning of this system is important to vehicle and occupant safety as well as to the safety of other drivers. Notwithstanding the past improvements and reliability of this system it remains fundamentally the same in terms of its electromechanical operation. The brake lamp system is actuated with closure of a brake switch connected to the brake pedal, such that when the brake pedal is depressed the switch closes and applies 12 VDC to the brake lamps. While this system has high reliability due to its simplicity, there is no immediate notice to the driver of a failure in the brake lamp system. Such a failure could include a failed switch which, although the braking system operates, fails to provide the excitation voltage to the lamps. Alternatively, a common problem is burn out of one or more of the brake lamps. These failures generally take time to discover and are usually determined by verbal warnings from other parties.

DISCLOSURE OF INVENTION

One object of the present invention is to provide apparatus for providing automated performance monitoring of a motor vehicle's brake lamp system. Another object of the present invention is to provide automated recording of a failed brake lamp condition and to facilitate technician access to these records during service maintenance. Still another object of the present invention is to provide an automated warning to the vehicle operator/occupant of a failed brake lamp condition.

According to the present invention, a microprocessor based control detects actuation of the vehicle's braking system and senses the actual magnitude of the lamp current drawn by the system's brake lamps during illumination; the microprocessor having a memory for storing signals, including a plurality of reference signals indicative of the nominal value of brake lamp excitation current required for illumination of a full compliment of brake lamps as well as the current value nominally associated with successively lesser numbers of operating lamps; the microprocessor comparing the sensed actual magnitude of the lamp current with each of the reference signals to determine the presence and number of inoperative lamps.

In further accord with the present invention the microprocessor stores in memory the number of inoperative lamps detected. In still further accord with the present invention, the microprocessor based control includes interface circuitry which is operatively connected to the microprocessor and is also adapted for operative connectability to external equipment to permit the automated read-out of recorded lamp failure messages to be used in the servicing of the vehicle. In still further accord with the present invention the microprocessor based control also provides a visible and or audible warning to the operator of inoperative brake lamps.

The present invention provides for intelligent means to monitor the performance of a motor vehicle's brake signaling system. The system includes detection and reporting of failure modes in lamp excitation to permit efficient repair, as well as providing real time alarms to the vehicle operator in the event of a signal device failure constituting a safety failure condition.

These and other objects, features, and advantages of the present invention will become more apparent in light of the following detailed description of a best mode embodiment thereof; as illustrated in the accompanying Drawing.

BEST MODE FOR CARRYING OUT THE INVENTION

Figure 1:
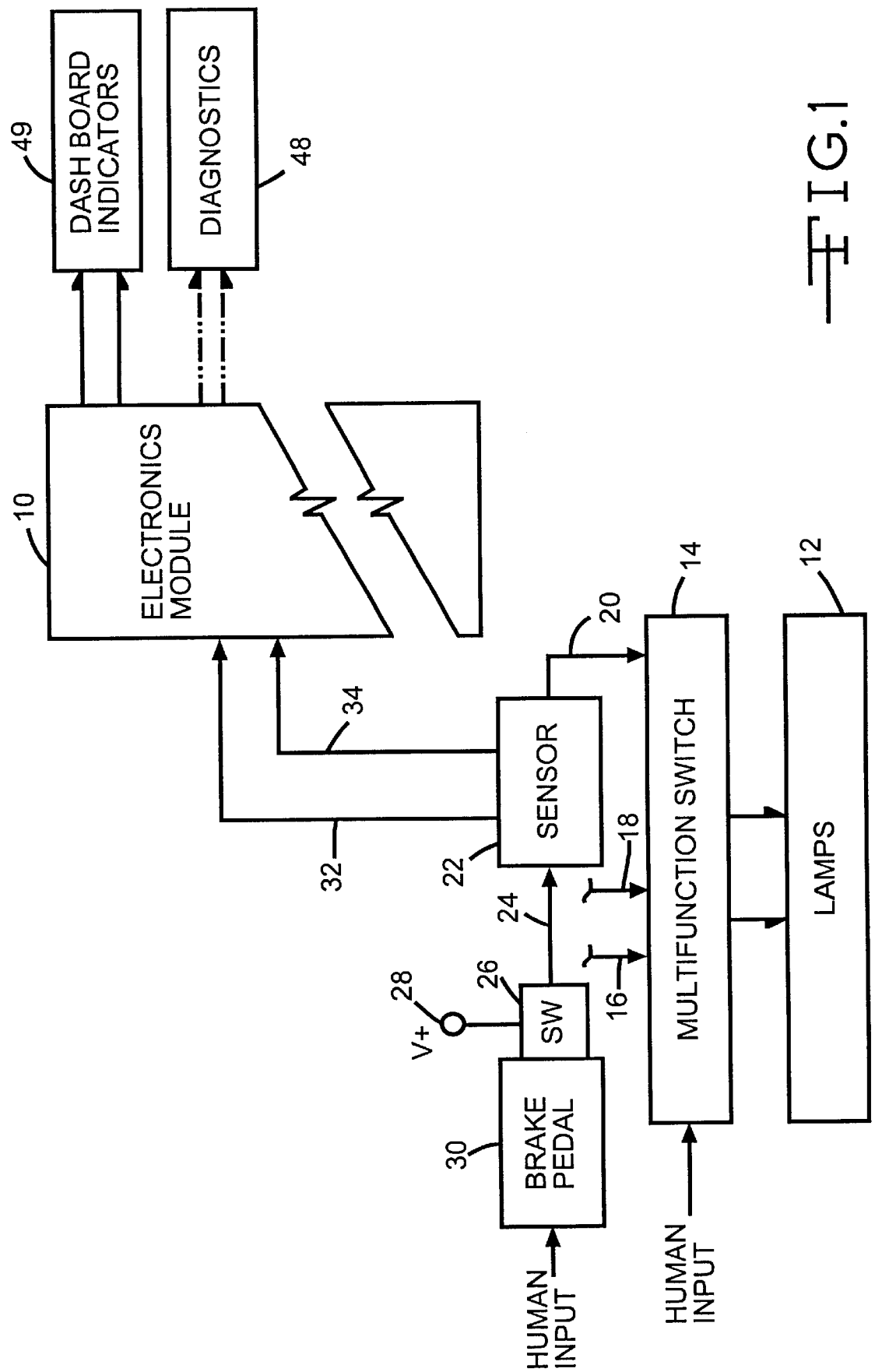
FIG. 1 is a system block diagram of one embodiment of the present invention.

Referring to FIG. 1, which illustrates in block diagram form the interconnection of the present electronic module 10 with the vehicle's brake lamp circuitry. In the simplified FIG. 1 illustration the brake lamps are shown as part of the vehicle's lamp block 12 which is energized by signal currents routed through a multi-function switch 14. The switch 14 is of a well known type multi-positionable function switch which is mounted within the operator's reach, typically as a wand on the steering column, and is responsive to operator control for selective actuation of the vehicle's turn signals and hazard lamps. As described in detail hereinafter with respect to FIG. 2, positioning of the switch 14 actuates various ganged switches to complete the current path to the selected function lamps.

In the present embodiment, the lamp excitation current is provided to the switch 14 on lines 16 for the turn signal lamps, on line 18 for the hazard lamp function, and on line 20 for the brake lamps. The turn signaling and hazard signaling functions are disclosed in the hereinbefore referenced, copending application, and are not a part of the present invention. The line 20 provides the brake lamp excitation current through current sensor 22 and line 24 from the vehicle's brake switch 26, which connects line 24 to the vehicle power source 28 when the operator depresses the vehicle brake pedal 30.

The module 10 receives the sensed actual value of the line 20 brake lamp excitation current from the sensor 22 on lines 32, 34. As described in detail hereinafter with respect to FIGS. 2, 3 the module senses the operator's application of pressure to the brake pedal 30 and monitors the brake lamp excitation current to determine proper brake lamp operation. As described in greater detail with respect to FIG. 2, the electronics module 10 monitors the actual brake lamp current to determine proper lamp operation, but, in the event of one or more lamp failures, the module quantifies the number of inoperative lamps and records the failures in memory. These recorded failures, referred to as Device Trouble Codes (DTC), may be accessed and copied to external diagnostic equipment 48 which may be used to review the brake system's performance history during maintenance servicing of the vehicle.

To the extent that the number of inoperative lamps is considered to be a safety hazard, the module also provides an active warning to the operator. Typically this is performed by a dashboard mounted indicator 49; preferably a dashboard lamp with animated illumination, such as a flashing or pulsating light. However, audible warnings may also be used if considered appropriate under the circumstances of vehicle operation.

Figure 2:
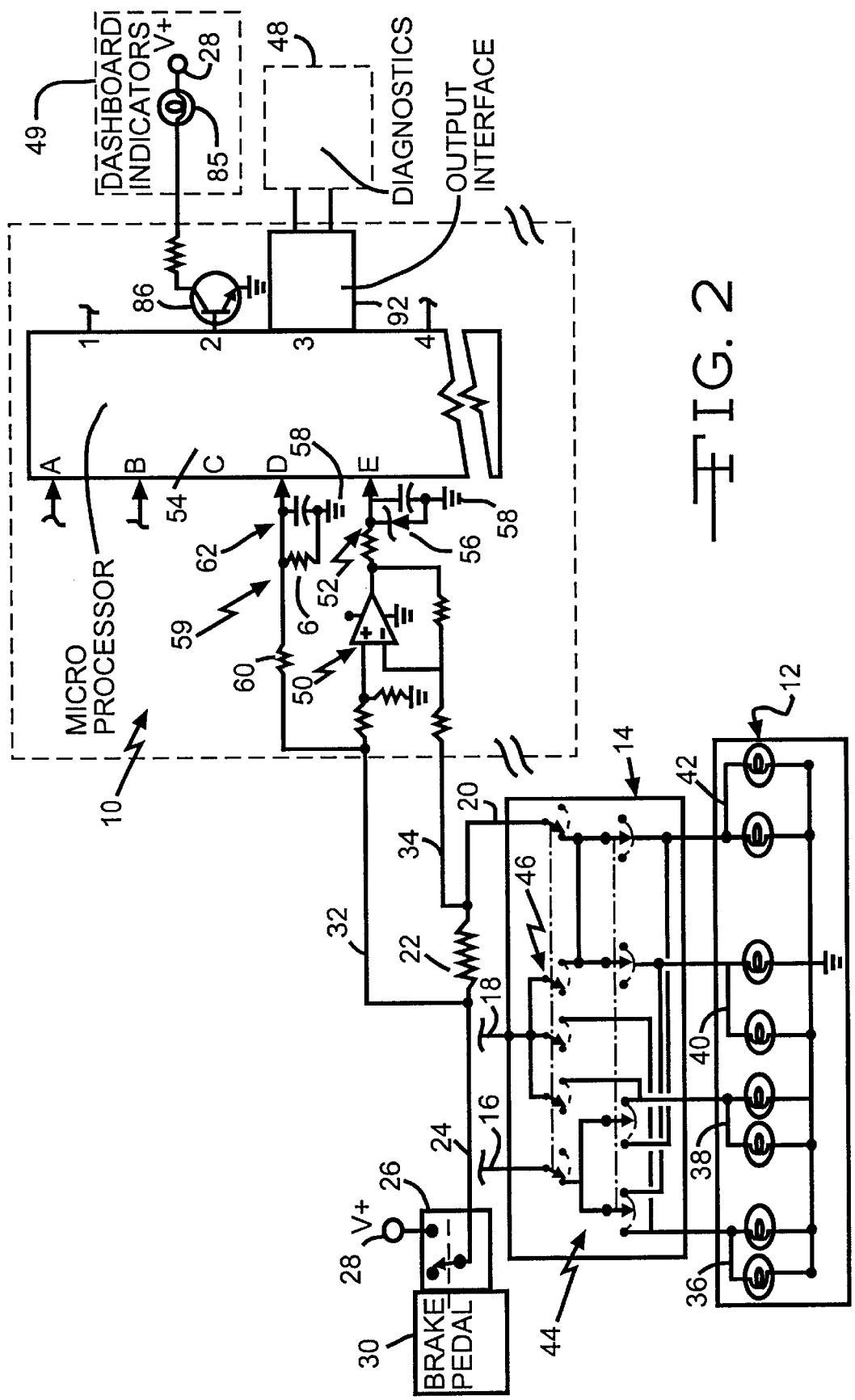
FIG. 2 is a schematic illustration of the embodiment of FIG. 1.

Referring now to FIG. 2, which is a schematic diagram illustrating the circuit details of the electronics module 10, the lamp block 12, the multi-function switch 14, and the current sensor 22. The elements in FIG. 2 which are common to those in FIG. 1 have the same reference numerals. As will become more evident hereinafter, the present invention provides a multi-function module which identifies the existence of failed brake lamps and, under selected circumstances, sends visible and/or audible warnings to the operator of the existence of a failure condition. The module may be adapted to various automobile brake lamp system configurations, as established by the automobile manufacturer. To the extent that the vehicle's signal lamps serve dual purposes, e.g. the turn signal lamps and the brake lamps also serve as the hazard lamps, and in some vehicle models the brake lamps also serve as the rear turn signal lamps, the present system has the ability to cross-correlate the measured values of excitation current in these different signaling functions to more closely identify, or even exactly identify, a failed lamp. This provides for a greater range and depth of diagnostics which may isolate failure modes to particular lamps and/or functional elements. The embodiment of FIGS. 1–3 assume separate lamp functions for the turn signal and brake lamps.

In FIG. 2 , the lamp block 12 includes left and right pairs of turn signals 36, 38 as well as right and left pairs of brake lamps 40, 42. The turn signal lamps are actuated through the turn signal switch 44 enclosed within the multi-function switch 14, and provides the left and right lamp current excitation signal path from the line 16 with closure of the contacts as marked in FIG. 2. The multi-function switch also includes a hazard switch function 46 which when placed by the operator in the ON position provides the current excitation signal path from the line 18. With the hazard switch in the normally off position the current excitation signal path from the line 20 is completed to the right and left pairs of brake lamps 40, 42.

The brake lamp current on line 20 is provided through current sensor 22 and line 24 in response to closure of the brake switch 26 with applied pressure to the brake pedal 30 by the operator. In the FIG. 2 embodiment the sensor 22 is a series resistor, the value of which is scaled in dependence on the anticipated magnitude of the lamp excitation signal, i.e. the current load. In the present embodiment the brake lamp filament resistance is on the order of 45 to 50 ohms, and with a 12 volt DC vehicle power source the four brake lamp nominal current load is 1.0 ampere. In this example, the resistance value of the sensor 30 may be on the order of one ohm. This provides a balance between nominal input signal scaling and power dissipation of the sensor, which in this case is 1.0 volt and 1 watt respectively. It should be understood, however, that there is a good degree of latitude in selecting the resistance value based on the requirements of the particular application. Similarly, the resistor type may be any known type deemed suitable for the application by those skilled in the art.

The output of the current sensor 22 is provided as a voltage signal on lines 32 and 34 to the module 10. The received sensed signal is applied differentially to operational amplifier circuitry 50 within the module 10. The operational amplifier circuitry is well known and includes the use of an operational amplifier, typically a model type 741 or equivalent with an open loop gain of 50,000 v/v, which is connected in a closed loop voltage follower configuration with the scaling resistors shown. The nominal closed loop gain is 1.0 volt/volt, but may be adjusted upward or downward to achieve the desired input signal/output signal scale balance.

The voltage signal output of the amplifier circuit 50 is coupled through a resistor/capacitor (RC) filter 52 to the input, shown illustratively as input E, of a microprocessor 54. The voltage signal magnitude to the microprocessor input is limited by zener diode 56 to protect against over voltage due to voltage transients as may occur in a motor vehicle power source. The microprocessor is a known type, such as the MOTOROLA model MC68HC05 family of 8 bit microprocessors, or equivalents thereof as may be deemed suitable by those skilled in the art for the intended application. A higher performance microprocessor may be used if greater programming ability is required for the performance of failure diagnostics or more input/output capability is required. The nominal voltage signal scaling at the microprocessor inputs is approximately 5.0 VDC for approximately 2.0 amperes, providing a scale factor of approximately 2.5 volts per amp. A 250 milliamp lamp current is, therefore, scaled to a nominal 0.50 VDC at the microprocessor input. This provides sufficient scale accuracy to permit the microprocessor to differentiate the excitation signal magnitude on a per lamp basis to detect inoperative lamps.

The module 10 also includes detection circuit 59, comprising a resistor 60 electrically connected in series between the line 32 and a second input, shown illustratively as input D, of the microprocessor 54, and including a resistor/capacitor (RC) lag filter 61, comprising the parallel combination of resistor 62 and capacitor 63, connected between the processor input D and signal ground 58. The resitors 60, 62 scale the line 32 voltage signal magnitude down to the acceptable input limits of the microprocessor, while the lag filter filters noise and voltage spikes that may be present on line 32.

Referring to the line 20 current path, the detection circuit 59 monitors the brake signaling state. With no operator applied pressure to the brake pedal 30 brake switch 26 remains open and the voltage potential on the line 32 and at input D of the microprocessor 54, is LOW (near zero). When the brake pedal is depressed the switch 26 closes applying V⁺ (power source 28) to line 32 and causing the voltage potential on line 32 and the microprocessor input D to go HIGH. This signifies a brake signaling state to the microprocessor while simultaneously applying signal current to the brake lamp pairs 40, 42.

Figure 3:
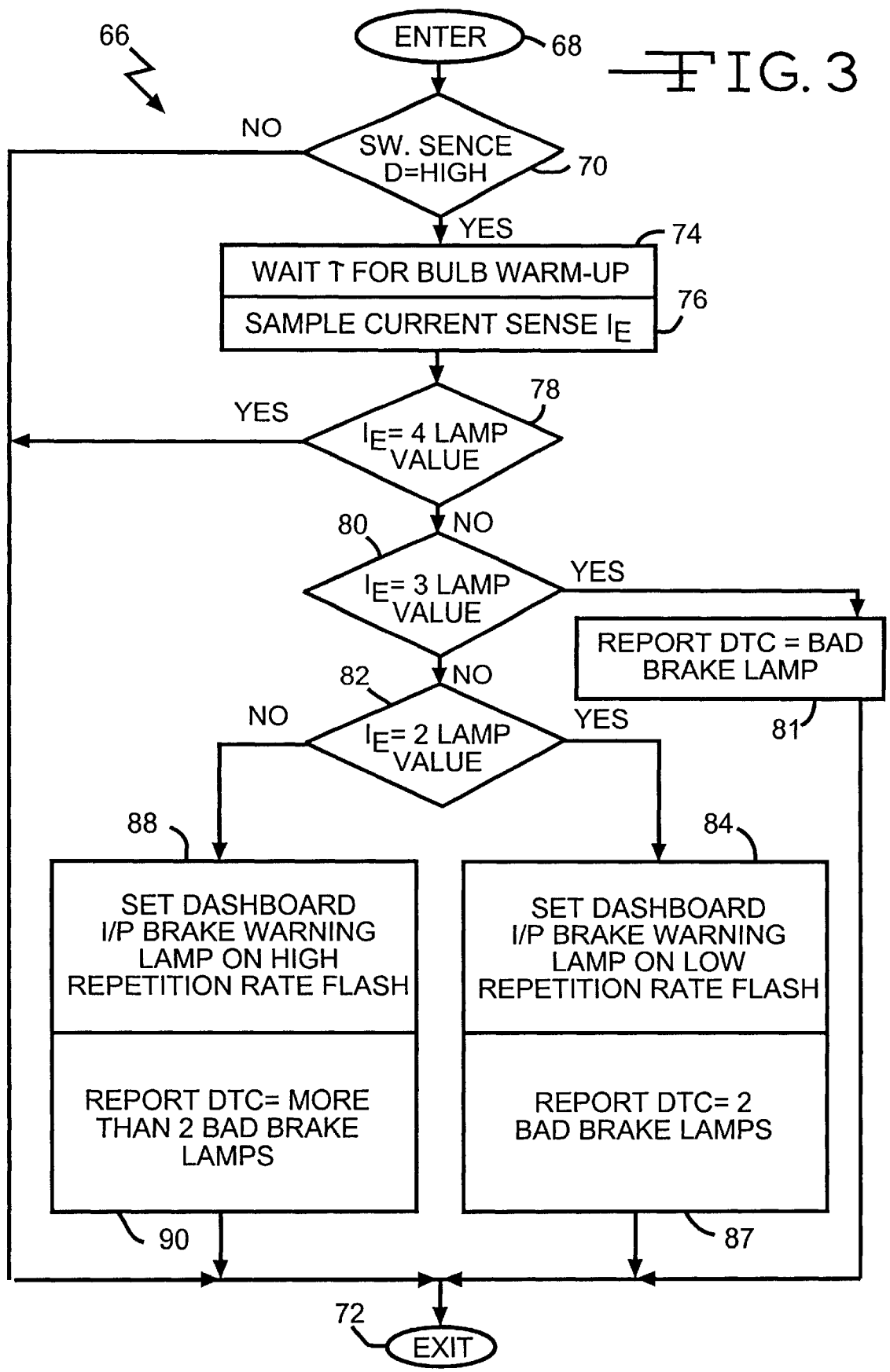
FIG. 3 is a flow chart diagram illustrating the process steps performed by the embodiment of FIG. 2.

Referring now to FIG. 3, the microprocessor 54 (FIG. 2) enters the brake performance monitoring routine 66 at 68, and decision 70 determines if the D input to the processor 54 (FIG. 2) is HIGH. As described hereinbefore line 32 and the processor D input of FIG. 2 are high in the presence of closure of the brake switch 26 in response to application of the brake pedal 30. If the answer to decision 70 is NO, the routine exits at 72. If the answer is YES, instructions 74 require a pause to allow for bulb warm-up prior to sampling the sensed brake current $I_E$ in instructions 76. The sensed $I_E$ value is presented at the E input of the processor as a scaled voltage signal equivalent of the sensed current magnitude by operational amplifier circuitry 50 (FIG. 2), as previously described.

The microprocessor 54 includes a read only memory (ROM), one portion of which includes a plurality of stored reference signals. Each reference signal is representative of the nominal magnitude value of excitation current associated with various combinations of illuminated brake lamps. As an example, assuming the nominal 250 milliamp excitation current for the brake lamps as described hereinbefore, the nominal current magnitude for the full four lamp complement is 1.0 ampere; three lamps would be 750 ma, two lamps 500 ma, etc. In other words, the plurality of reference signals stored in the processor's memory are indicative of the nominal current values associated with illumination of the full brake lamp complement, and also the nominal current values associated with illumination of successively fewer numbers of operating lamps, which mimics the current conditions associated with multiple brake lamp failures. The reference signals may be stored in a look-up table format.

Decision 78 determines if the sensed current value is substantially equal to that of the nominal current load for illumination of a full brake lamp complement. If the answer to decision 78 is YES the routine exits at 72, and if the answer is NO decision 80 determines if there is one lamp failure. If this answer is YES, instructions 81 command the processor to report an error message DTC report of a bad brake lamp, after which the routine exits at 72. If the answer to 80 is NO, decision 82 determines if at least two of the four brake lamps are operating. In the present embodiment, with a full brake lamp complement of four bulbs, this determines if at least 50% of the system is operating. Similarly, in other vehicle models having more or less numbers of brake lamps in a full system complement, the routine 66 may be adjusted as necessary to test for this 50% status.

If the answer to decision 82 is YES, instructions 84 require that the Instrument Panel (I/P) Brake Warning Lamp 85 (FIG. 2) be illuminated at a low pulse repetition frequency (PRF) flash to provide a visual warning to the operator that there are two brake lamps that are out. As shown in FIG. 2, the processor responds to the instructions by turning on transistor 86, which is a known type NPN transistor, such as an MMBT AO6 or equivalent. When on, transistor 86 connects the I/P Brake Warning Lamp to signal ground 58 at a prescribed duty cycle and PRF, allowing current flow through the I/P Brake Lamp 85 from the vehicle V⁺ power source 28 and producing a pulsed illumination of the lamp. As shown in FIG. 2 the lamp 85 is located among the dashboard indicators 49, within the operator's field of view. Next, instructions 87 (FIG. 3) require a DTC error message of two bad brake lamps to be written to memory.

If the answer to decision 82 is NO, meaning that there are more than two brake lamps that are not operating, instructions 88 request the I/P Brake Warning Lamp 85 be set at a high frequency pulse repetition rate (i.e. higher then that in instructions 84), thereby signifying a greater safety hazard. Instructions 90 then require a DTC error of more than two bad brake lamps. Following instructions 87 or 90 the routine is exited at 72.

In the present module all of the DTC error messages are stored in the memory of microprocessor 54 and may be accessed by the external diagnostic equipment 48 (shown in phantom, FIG. 2) through an output interface 92. This permits ready and efficient diagnosis of the performance history for the signaling system in a manner that may be automated to the same extent as analysis and diagnosis of the vehicle's engine, thereby providing for more thorough and more timely repairs.

The electronics module of the present invention may be used in conjunction with the control module disclosed in the referenced copending application to allow a broader range of lamp diagnostics to be performed, such as vehicle models in which lamps provide dual functions. In situations where the rear turn signal lamps are also a portion of the brake lamps, and where the hazard lamp signaling function uses all of the vehicle's signaling lamps, there may be opportunities for diagnosis through cross correlation of results, including the identification of particular lamps which are inoperative Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

I claim:

1. A system for monitoring the brake lamp signaling function of a motor vehicle, the system comprising:

a lamp block including a plurality of lamps;

a switch operatively connected to said lamp block for providing an enable signal when a brake pedal is depressed;

a sensor operatively connected to said switch for sensing a lamp excitation current when the brake pedal is depressed;

a microprocessor operatively connected to said sensor, said microprocessor including a memory for storing a plurality of reference signals, each reference signal indicative of a nominal lamp excitation current required for illumination of a full compliment of operating lamps of said lamp block and a successively lesser number of operating lamps of said lamp block, said microprocessor comparing the lamp excitation current from said sensor with each of the reference signals to determine the presence and number of operative lamps from the plurality of lamps of said lamp block and storing in said memory the number of operative lamps when the lamp excitation current sensed by said sensor is less than the nominal lamp excitation current stored in the memory of said microprocessor; and an output interface operatively connected to said microprocessor and adapted to operatively connect to external equipment to permit automated read-out of the number of operative lamps stored in the memory of said microprocessor.

2. The system according to claim 1, further including an alarm operatively connected to said microprocessor for providing a warning when the lamp excitation current sensed by said sensor is less than the nominal lamp excitation current stored in the memory of said microprocessor.

3. The system according to claim 2, wherein the warning is a warning lamp.

4. The system according to claim 3, wherein said microprocessor sets the warning lamp on a low repetition flash rate when the number of operative lamps is determined by said microprocessor to be equal to a first number of operative lamps, and wherein said microprocessor sets the warning lamp on a high repetition flash rate when the number of operative lamps is determined by said microprocessor to be equal to a second number of operative lamps, the second number of operative lamps being less than the first number of operative lamps.

5. The system according to claim 2, wherein the warning is an audio warning.

6. The system according to claim 1, wherein said lamp block includes a pair of left and right turn signal lamps and a pair of left and right brake lamps.

7. An electronics module for brake lamp diagnostics, comprising a microprocessor adapted to be connected to a sensor that senses the application of pressure to a brake pedal and provides a brake lamp excitation current from a lamp block to said microprocessor, said microprocessor including a memory for storing a plurality of reference signals, each reference signal indicative of a nominal lamp excitation current required for illumination of a full compliment of operating lamps of said lamp block and a successively lesser number of operating lamps of said lamp block, said microprocessor comparing the brake lamp excitation current from said sensor with each of the reference signals to determine the presence and number of operative lamps from the plurality of lamps of said lamp block, wherein said microprocessor sets a warning lamp on a low repetition flash rate when the number of operative lamps is determined by said microprocessor to be equal to a first number of operative lamps and wherein said microprocessor sets the warning lamp on a high repetition flash rate when the number of operative lamps is determined by said microprocessor to be equal to a second number of operative lamps, the second number of operative lamps being less than the first number of operative lamps.

8. The system according to claim 7, wherein said microprocessor stores in memory the number of operative lamps when the lamp excitation current sensed by said sensor is less than the nominal lamp excitation current stored in the memory of said microprocessor.

9. The system according to claim 8, further including an output interface operatively connected to said microprocessor and adapted to operatively connect to external equipment to permit automated read-out of the number of operative lamps stored in the memory of said microprocessor.

10. The system according to claim 7, wherein said lamp block includes a pair of left and right turn signal lamps and a pair of left and right brake lamps.

11. A system for monitoring the brake lamp signaling function of a motor vehicle, the system comprising:

a lamp block including a plurality of lamps;

a switch operatively connected to said lamp block for providing an enable signal when a brake pedal is depressed;

a sensor operatively connected to said switch for sensing a lamp excitation current when the brake pedal is depressed; and a microprocessor adapted to be connected to a sensor that senses the application of pressure to a brake pedal and provides a brake lamp excitation current from a lamp block to said microprocessor, said microprocessor including a memory for storing a plurality of reference signals, each reference signal indicative of a nominal lamp excitation current required for illumination of a full compliment of operating lamps of said lamp block and a successively lesser number of operating lamps of said lamp block, said microprocessor comparing the brake lamp excitation current from said sensor with each of the reference signals to determine the presence and number of operative lamps from the plurality of lamps of said lamp block, wherein said microprocessor sets a warning lamp on a low repetition flash rate when the number of operative lamps is determined by said microprocessor to be equal to a first number of operative lamps, and wherein said microprocessor sets said warning lamp on a high repetition flash rate when the number of operative lamps is determined by said microprocessor to be equal to a second number of operative lamps, the second number of operative lamps being less than the first number of operative lamps.

12. The system according to claim 11, further including an alarm operatively connected to said microprocessor for providing a warning when the lamp excitation current sensed by said sensor is less than the nominal lamp excitation current stored in the memory of said microprocessor.

13. The system according to claim 12, wherein the warning is an audio warning.

14. The system according to claim 11, wherein the nominal lamp excitation current is stored in the memory of said microprocessor.

15. The system according to claim 11, further including an output interface operatively connected to said microprocessor and adapted to operatively connect to external equipment to permit automated read-out of the number of operative lamps stored in the memory of said microprocessor.

16. The system according to claim 11, wherein said lamp block includes a pair of left and right turn signal lamps and a pair of left and right brake lamps.

\* \* \* \* \*